United States Patent
Biermann et al.

(10) Patent No.: US 9,267,593 B2
(45) Date of Patent: Feb. 23, 2016

(54) PLANETARY GEAR WITH A DIFFERENTIAL GEAR

(71) Applicant: Schaeffler Technologies GmbH & Co. KG, Herzogenaurach (DE)

(72) Inventors: Thorsten Biermann, Wachenroth (DE); Harald Martini, Herzogenaurach (DE)

(73) Assignee: Schaeffler Technologies AG & Co. KG, Herzoengaurach (DE)

(*) Notice: Subject to any disclaimer, the term of this patent is extended or adjusted under 35 U.S.C. 154(b) by 0 days.

(21) Appl. No.: 14/335,397

(22) Filed: Jul. 18, 2014

(65) Prior Publication Data

US 2014/0329634 A1 Nov. 6, 2014

Related U.S. Application Data

(63) Continuation of application No. PCT/EP2013/057947, filed on Apr. 17, 2013.

(30) Foreign Application Priority Data

Apr. 19, 2012 (DE) .................... 10 2012 206 441
Apr. 15, 2013 (DE) .................... 10 2013 206 677

(51) Int. Cl.
*F16H 48/38* (2012.01)
*F16H 48/11* (2012.01)
*F16H 48/10* (2012.01)

(52) U.S. Cl.
CPC ............... *F16H 48/38* (2013.01); *F16H 48/10* (2013.01); *F16H 48/11* (2013.01); *F16H 2048/106* (2013.01)

(58) Field of Classification Search
CPC ......... F16H 48/10; F16H 48/11; F16H 48/38; F16H 48/40; F16H 48/42; F16H 2048/106; F16H 2048/405; F16H 2048/423

See application file for complete search history.

(56) References Cited

U.S. PATENT DOCUMENTS

| | | | | |
|---|---|---|---|---|
| 2,142,575 | A * | 1/1939 | Spicacel | 475/247 |
| 8,409,044 | B2 * | 4/2013 | Hilker et al. | 475/160 |
| 2006/0183589 | A1 * | 8/2006 | Naka et al. | 475/30 |
| 2011/0045934 | A1 * | 2/2011 | Biermann et al. | 475/252 |

FOREIGN PATENT DOCUMENTS

| | | |
|---|---|---|
| DE | 10156890 C1 | 4/2003 |
| DE | 102007004712 A1 | 8/2008 |
| DE | 102009017397 A1 | 11/2009 |
| DE | 102010036247 A1 | 3/2012 |
| WO | 2008092526 A1 | 8/2008 |
| WO | 2010112366 A1 | 10/2010 |

* cited by examiner

*Primary Examiner* — Huan Le
(74) *Attorney, Agent, or Firm* — Simpson & Simpson, PLLC

(57) ABSTRACT

A planetary gear (1) with a differential gear, a planet carrier (4) to which at least one planetary gear (7) is rotatably connected with at least one sun wheel (8, 9) that is at least in meshing operative engagement with one planetary gear, whereby the planetary carrier (4) is supported by at least one bearing (11) axially and/or radially in a housing (12), whereby a first raceway (15) of the bearing (11) is formed on a housing-fixed member and a second raceway (17) of the bearing (11) is formed on a planetary carrier-fixed member, whereby a support pot (18) encompasses the said bearing (11) radially at least partially on the outside, wherein the support pot (18) is supported on a radially outer side (24) of the planet carrier (4).

10 Claims, 5 Drawing Sheets

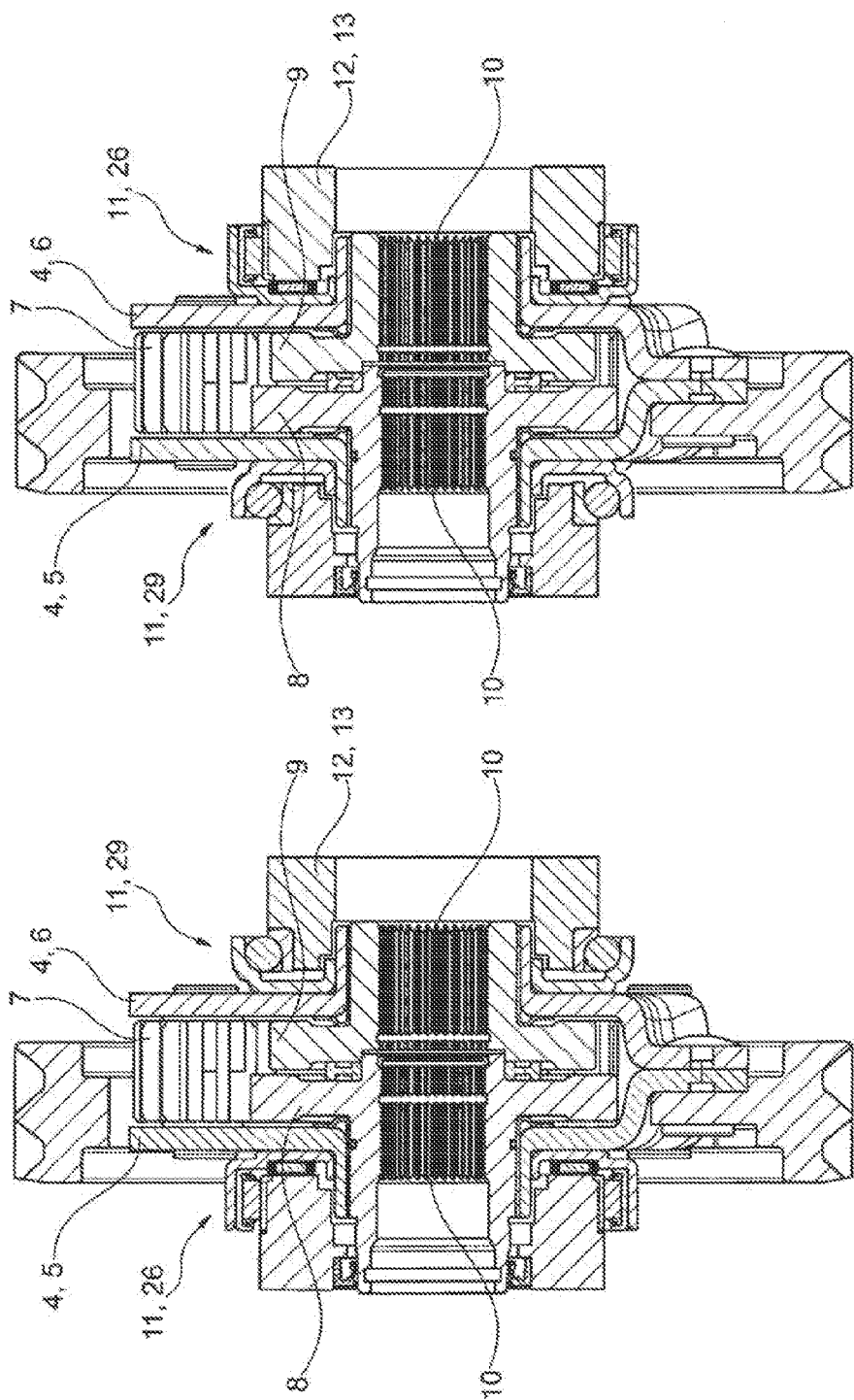

PLANETARY GEAR WITH A DIFFERENTIAL GEAR

CROSS-REFERENCE TO RELATED APPLICATIONS

This patent application is filed under to 35 U.S.C. §120 and §365(c) as a continuation of International Patent Application PCT/EP2013/057947, filed Apr. 17, 2013, and claims priority to German Patent Application No. DE102012206441.9, filed Apr. 19, 2012, and German Patent Application No. DE102013206677.5, filed Apr. 15, 2013, which applications are incorporated herein by reference in their entirety.

FIELD OF THE INVENTION

The invention relates to a planetary gear, such as a differential gear, with a planetary carrier to which at least one planetary wheel is rotatably connected and which is at least in meshing operative contact with a sun wheel, whereby the planetary carrier has at least one bearing axially and/or radially supported in a housing, such as a transmission housing, whereby a first raceway of the bearing is formed on a stationary component, while a second raceway of the bearing is formed on a component fixed to a planetary carrier, whereby a support pot encompasses the bearing radially, at least partially on the outside. The support pot can also be referred to as a bearing flange. In theory, the support pot can also be designed as a cylindrical sleeve with steps and beadings. The planetary carrier can also be referred to as a cage; in particular it can be designed as a differential cage.

BACKGROUND OF THE INVENTION

Various planetary gears are already known in the prior art, for example from EP 0156067.

In principle, differential gears for motor vehicles are known from DE 10156890 C1. A differential gear for a motor vehicle with a differential housing having a drive sprocket supported in a housing wall is disclosed there, in which a differential bolt is arranged with at least a rotatably mounted differential pinion that engages with a drive gear of a drive shaft mounted in the differential housing. The drive shaft is supported by at least a first bearing in the housing wall of the differential gear and/or the differential housing by means of at least one second bearing for the drive shaft, while the drive shaft has a common bearing bush for the first bearing serving as a shaft bearing of the drive shaft and the housing bearing of the differential housing.

A differential arrangement engaging with bevel gears is also known from U.S. Pat. No. 7,775,928.

Furthermore, a gear arrangement that engages with planetary wheels is known from DE 10 2009 017 397 A1. The gear arrangement introduced there relates to a differential gear with a drive-side wheel member, a first drive wheel that is rotationally fixed to a first driven axle, while a second drive wheel is rotationally fixed to a second driven axle, whereby between the said first drive wheel and the said second drive wheel, a gear assembly is provided for transmitting torque from the drive-side wheel member to the first drive wheel and second drive wheel. The first drive wheel member in this case has the form of a first drive wheel with a bulge that is radially spaced from the first drive axle. The second drive member furthermore has the form of a second drive wheel extending radially outwards from the second drive axle. Further, the bulge extends farther away from the second drive wheel. The gear assembly is disposed in a space formed by the protrusion of the first drive wheel and the opposite region of the space formed by the second drive wheel.

Such planetary gears, which are designed as differential gears, can be formed as spur wheel differential gears as they are known, for example, from WO 2010/112366 A1. The spur wheel differential gear arrangement presented there discloses the operational capability in a motor vehicle. In this case, each toothed helical sun wheel, planetary wheel and a hollow wheel are supported by a surrounding housing with bearings, so that the parallel sun wheels are each coupled with parallel drive shafts. It is provided in this publication that frictional surfaces are disposed between the parallel sun wheels and/or between the sun wheels and the surrounding housing.

It is the object of the present invention to avoid the disadvantages of the prior art and to achieve in particular a tilt-proof and resilient mounting of the planetary carrier in the housing. Costs need to be kept low, while a particularly compact design can be achieved in particular in the axial direction, but also in the radial direction.

BRIEF SUMMARY OF THE INVENTION

This objective is inventively achieved in that the support pot is supported on a radial outer side of the planetary carrier.

Thus it is advantageous if the support pot has an axially projecting collar that is supported on a circumferential surface of the planetary carrier. The mounting can then be simplified, particularly if the bearing, designed as a rolling bearing, is assembled in the support pot as a pre-assembled unit.

It is advantageous if the collar is supported on the circumferential surface in the region of a flange extending in the axial direction of the planetary carrier. A sufficiently large contact area can then be made available and good steadiness against tilting achieved.

It is advantageous if the collar is provided with a frictional and/or positive connection between the support pot and the planetary carrier, preferably utilizing a press fit. An efficient transport lock can be achieved and the coming apart of the individual components can be avoided especially by using a positive connection. Press fits also serve for precise dimensioning and layout.

The length of the press fit is determined by the press-fit force, which in turn has a beneficial effect if the axial length of the press fit is selected depending on the press-fit force to be transmitted.

When the second raceway is formed on the support pot, then an additional element, such as an outer bearing shell can be omitted, or can be this bearing shell. In fact, it is also advantageous if the outer bearing shell or the bearing ring raceway is formed separately from a support pot, because then the pre-assembly can be simplified. Also it may be made of a plurality of identical components, which minimizes the cost.

In other words, therefore, the bearing ring is connected firmly to the planetary carrier, namely in the region of the press fit while, on the other hand, it forms a raceway or running surface, on which rolling elements such as balls, tapered rollers, or other similar elements may roll.

Thus it is advantageous if the bearing ring is formed as a bearing inner ring or a bearing outer ring. Particularly optimal is the traction, whereby the bearing ring is formed as a bearing inner ring, whereas the assembly may be simplified if the bearing ring is designed as a bearing outer ring.

To increase the life of the planetary gear, but at the same time to reduce the cost, it is advantageous if the bearing outer ring is designed to be swaged, i.e. swaged between the bearing inner ring and the planetary carrier and/or the bearing inner ring.

Equally beneficial for cost reduction, it has been found that when the first raceway is formed on the housing then the number of individual parts may be reduced, or when the first raceway is formed on a separate inner bearing shell or bearing ring on the housing, because then a modular assembly of the planetary gear is made easier.

An advantageous embodiment is characterized in that the bearing is designed as combined axial-radial rolling bearings or angular contact ball bearings, as tapered rolling bearings, or as spherical rolling bearings. Combined axial-radial rolling bearings may be understood, on the one hand, as a superimposed radially rolling sleeve supporting an axial bearing combination. It should be noted that the radial bearing may be obtained even without a rolling sleeve, in particular when the flange formed in the region of the bearing of the housing is hardened, and axial locking of the rolling raceway remains ensured.

When the collar is supported on the smallest or largest outside diameter of the planetary carrier, a force deflection is achieved, which is beneficial to the compact design of the planetary gear.

Finally, the invention also relates to a planetary gear that is embodied as a spur wheel differential with two sun wheels and two planetary wheel sets, whereby the planetary wheels of the two planetary wheel sets mesh with each other, and the planetary wheels of the planetary wheel set mesh with a sun wheel, while the planetary wheels of the other planetary wheel set mesh with the other sun wheel. Heavy and large-sized bevel gear differentials may be dispensed with this way.

One aspect of the invention also arranges that the outer ring is centered outside and not inside on a collar of the differential cage. Contrary to what is usual, the arrangement in the region of the bearing is, in fact, reversed, i.e., the bearing outer ring receives the differential cage/planetary carrier, while the bearing inner ring is seated on a stud of the housing.

BRIEF DESCRIPTION OF THE DRAWINGS

The invention will be explained in more detail with the aid of a drawing in which the different embodiments. In the drawings are presented:

FIG. 5 shows another embodiment of a planetary gear according to the invention, in which on the one hand, a combined axial-radial rolling bearing is used, while on the other hand, an angular contact ball bearing is used; and, FIG. 6 shows an additional embodiment in which the position of the combined axial-radial rolling bearing and the angular ball bearing is inverted with respect to the embodiment as shown in FIG. 5.

DETAILED DESCRIPTION OF THE INVENTION

Figure 1:
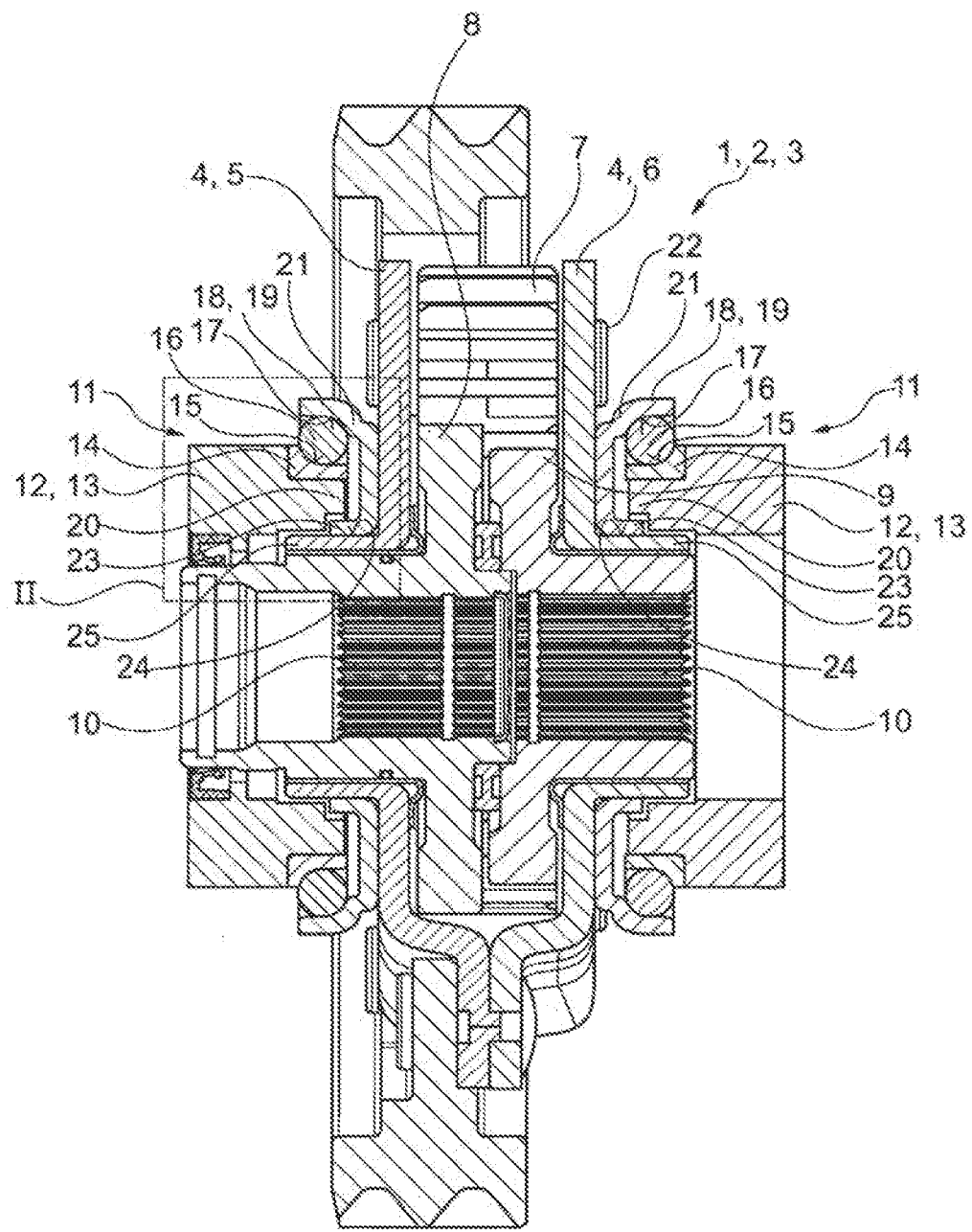
FIG. 1 shows a first embodiment of a planetary gear according to the invention in longitudinal section.

The figures are merely schematic in nature and are only for understanding the invention. The same elements are given the same reference numerals.

In FIG. 1 is shown a first planetary gear 1 according to the invention. Planetary gear 1 is designed as a differential gear 2, in particular constructed as a spur wheel differential 3.

There are two planetary wheel sets rotatably connected to a planetary carrier 4. Planetary carrier 4 comprises first planetary carrier half 5 and second planetary carrier half 6. Each planetary wheel set has a plurality of planet gears, and preferably 2, 3, 4, 5, 6, or 7 (or more) planetary wheels are used per planetary wheel set. A planetary wheel of a planetary wheel set is provided by way of example with reference numeral 7. It meshes with first sun wheel, 8. Planetary wheel 7 meshes with a further wheel that is part of the other planetary wheel set. This other planetary wheel meshes with second sun wheel 9. The two sun wheels 8 and 9 have a serration or spline on the inside, to allow a torque-transmitting engagement of a shaft.

Planetary carrier 4 is supported by bearing 11 on each side of the two sun wheels 8 and 9 on housing 12 that is formed as a gear housing 13.

Bearing 11 is formed as a rolling bearing. In the embodiment shown in FIG. 1, bearing 11 is formed as an angular contact ball bearing. Bearing inner shell 14 has a first raceway 15. Rolling bodies 16 in the form of balls roll on this first raceway 15. A second raceway 17 on rolling body 16 is on the side opposite to first raceway 15, namely on support pot 18 that is thus the bearing outer ring. Support pot 18 may also be referred to as bearing outer shell 19. In fact in the present embodiment, there is no separate bearing outer shell 19 or bearing ring. The functionality is integrated into support pot 18 instead.

Support pot 18 is made of sheet steel manufactured by deep drawing. It is possible to insert a separate bearing outer shell 19 between the rolling bodies 16 and support pot 18. As well, or alternatively, it is also possible to eliminate bearing inner shell 14 and form first raceway 15 on a portion of the transmission housing 13 constructed as a flange.

Due to the design according to the invention, it is possible to save axial space and simultaneously to bring bearing 11 radially outwards. A step 21, but also a plurality of steps 21 may be inserted in support pot 18 to obtain sufficient axial and radial distance to sleeves 22 overlapping the planetary wheels.

Support pot 18 also has collar 23 at its radially inner end, which could also be referred to as a beading. Collar 23 is axially aligned and is located flat against radially outer side 24 of axially extending flange 25 of the planetary carrier and/or the corresponding planetary carrier half. In particular, there is an interference fit.

The length of the press fit is determined by the press-fit force. Support pot 18, also referred to as the bearing flange, is pressed onto planetary carrier 4.

Figure 2:
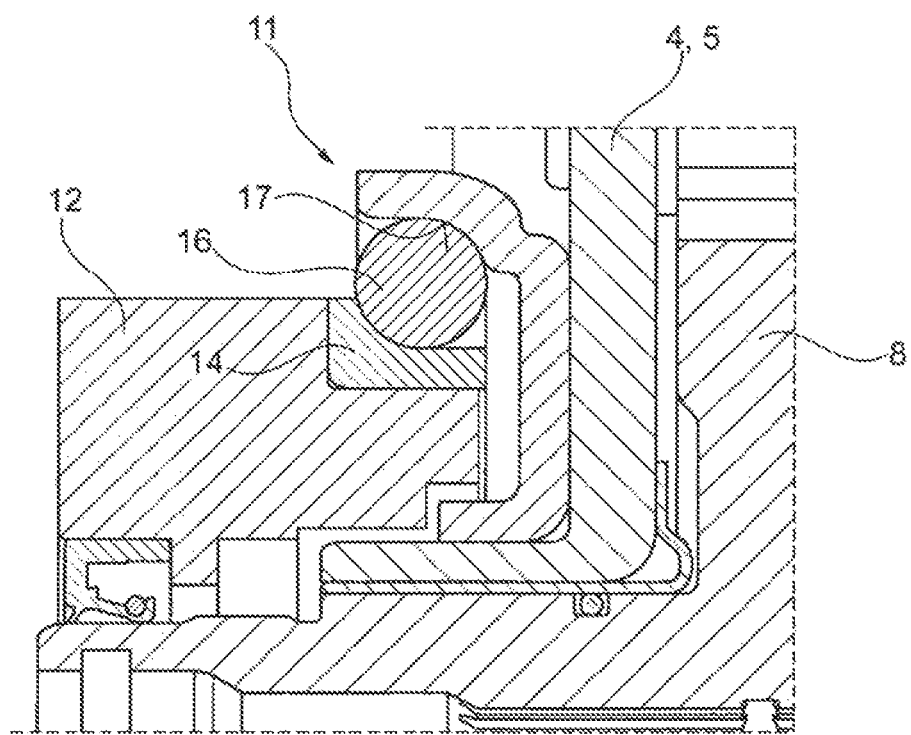
FIG. 2 shows an enlargement of region II from FIG. 1.
Figure 3:
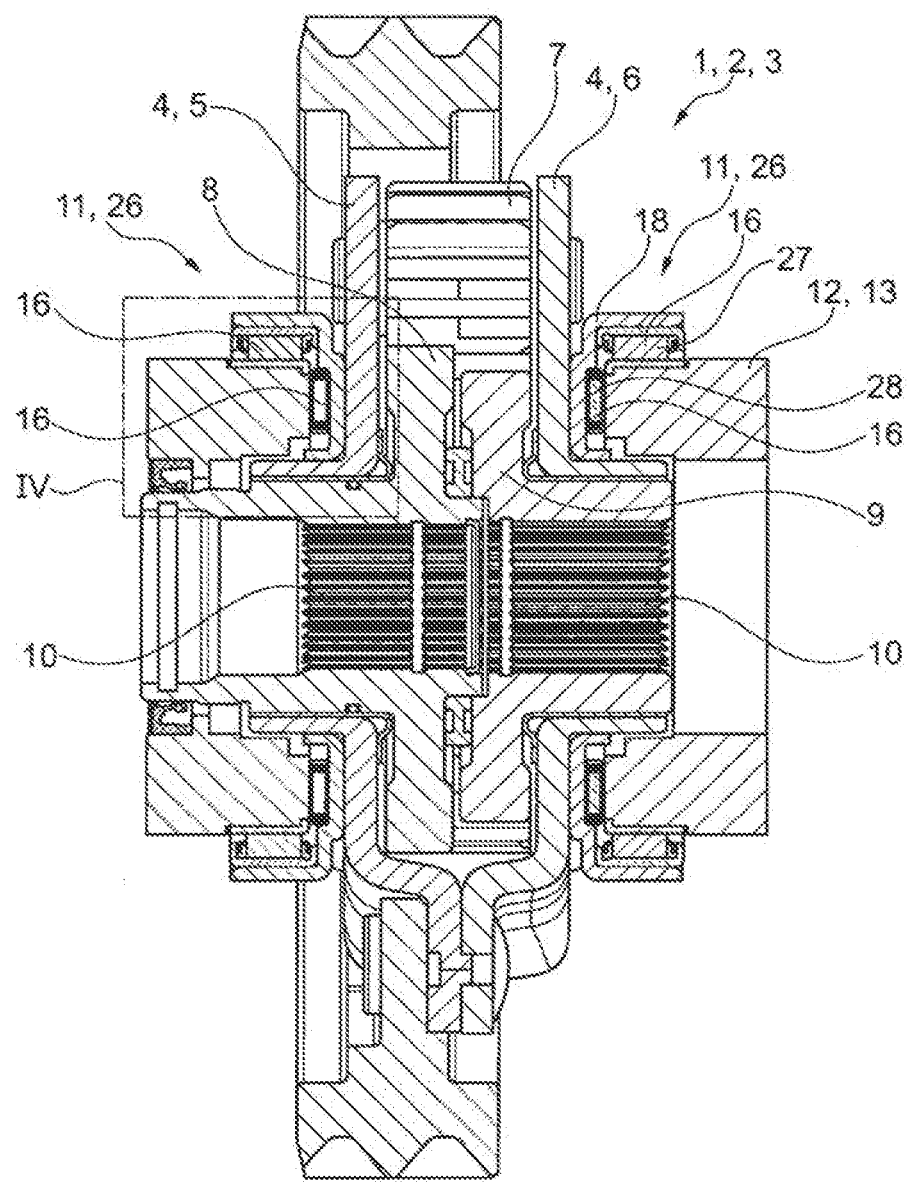
FIG. 3 shows a second embodiment of a planetary gear according to the invention in a representation similar to FIG. 1.

An enlargement of the bearing region is illustrated in FIG. 2, whereby second raceway 17, designed as a ball raceway, is integrated into deep-drawn support pot 18. This can advantageously eliminate an outer ring of the angular contact ball bearing. Axial space is used efficiently. It can save axial space. The inner diameter of the inner ring, i.e., bearing inner shell 14, can be larger. This allows greater forces to be transmitted.

Otherwise than in the embodiments of FIGS. 1 and 2, combined axial-radial bearings 26 may be used instead of contact ball bearings. In this case, rolling sleeve 27 and thrust rolling bearing 28 are combined with one another in a pre-assembled unit. In this case, bearing shells or bearing plates or rings are arranged between rolling bodies 16 and support pot 18 and/or rolling bodies 16 and housing 12. Rolling bodies 16 are designed as rollers or needles.

Figure 4:
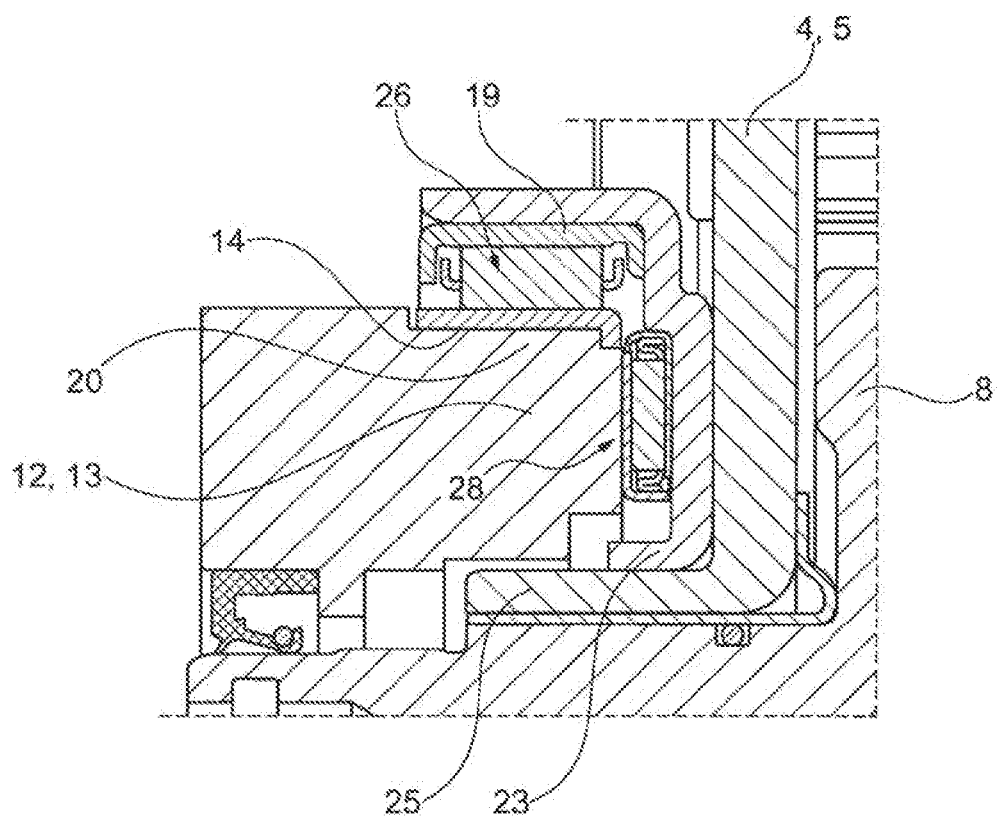
FIG. 4 shows an enlargement of region IV from FIG. 3.

An enlargement of the bearing region is again shown in FIG. 4, whereby the intermediate plates, rings, or shells are responsible for making raceways 15 and 17 available. The radial bearing may also be used without a rolling sleeve when flange 20 is hardened, and axial locking of the rolling ring is ensured.

A combination of a combined axial-radial bearing 26 is shown in FIGS. 5 and 6 on the one hand, and angular ball bearing 29 on the other. When combined axial-radial bearing 26 is arranged on one side and angular ball bearing 29 is arranged on the other side of planetary carrier 4, this is exactly opposite to the other embodiment.

Bearing inner shell 14 can also be referred to as the inner bearing shell. Bearing outer shell 19 can also be referred to as the outer bearing shell.

LIST OF REFERENCE NUMBERS

1 Planetary gear
2 Differential gear
3 Spur wheel gear
4 Planetary carrier
5 First planetary carrier half
6 Second planetary carrier half
7 Planetary wheel
8 First sun wheel
9 Second sun wheel
10 Serration or spline
11 Bearing
12 Housing
13 Transmission housing
14 Bearing inner shell
15 First raceway
16 Rolling elements
17 Second raceway
18 Support pot
19 Bearing outer shell
20 Flange
21 Step
22 Sleeve
23 Collar
24 Outer side
25 Flange
26 Combined axial-radial bearing
27 Rolling sleeve
28 Axial rolling bearing
29 Angular contact ball bearing

What is claimed is:

1. A planetary gear (1) with a differential gear, a planet carrier (4) to which at least one planetary wheel is rotatably connected with at least one sun wheel that is at least in meshing operative engagement with the at least one planetary wheel, whereby the planetary carrier (4) is supported by at least one bearing (11) axially and/or radially in a housing (12), whereby a first raceway (15) of the bearing (11) is formed on a housing-fixed member and a second raceway (17) of the bearing (11) is formed on a planetary carrier-fixed member, whereby a support pot (18) encompasses the said bearing (11) radially at least partially on the outside, wherein the support pot (18) is supported on a radially outer side (24) of the planet carrier (4).

2. The planetary gear recited in claim 1, wherein the bearing (11) has at least one second raceway (17) and a bearing shell (19) is formed as the support pot (18).

3. The planetary gear (1) recited in claim 1, wherein the first raceway (15) is formed on the housing (12), or on an inner bearing shell (14), or bearing ring separate from the housing (12).

4. The planetary gear (1) recited in claim 1, wherein the bearing (11) is formed as combined axial-radial rolling bearings (26), or is designed as angular contact ball bearings (29), or as tapered rolling bearings, or spherical rolling bearings.

5. The planetary gear (1) recited in claim 1, wherein the at least one sun wheel includes first and second sun wheels, wherein the planetary gear (1) is formed as a spur wheel gear with the first and second sun wheels, and first and second planetary wheel sets, whereby the planetary wheels of the first and second planetary wheel sets mesh with one another and the planetary wheel of the first planetary wheel set meshes with the first sun wheel, while the planetary wheel of the second planetary wheel set meshes with the second sun wheel.

6. The planetary gear (1) recited in claim 1, wherein a frictional and/or positive connection between the support pot (18) and the planetary carrier (4) is provided on the collar (23).

7. The planetary gear (1) recited in claim 6, wherein an axial length of an interference fit is selected as a function of a press-fit force to be transmitted.

8. The planetary gear (1) recited in claim 1, wherein the support pot (18) has an axially projecting collar (23), which is supported on a circumferential surface of the planetary carrier (3).

9. The planetary gear (1) recited in claim 8, wherein the collar (23) is supported on the circumferential surface in the region of an axially-extending flange (25) of the planetary carrier (4).

10. The planetary gear (1) recited in claim 8, wherein the collar (23) is supported on a largest or smallest outer diameter of the planetary carrier (4).

* * * * *